G. B. FOUTS.
DEVICE FOR REMOVING SNOW AND ICE FROM TROLLEY WIRES.
APPLICATION FILED AUG. 2, 1915.
1,192,053.
Patented July 25, 1916.
2 SHEETS—SHEET 1.
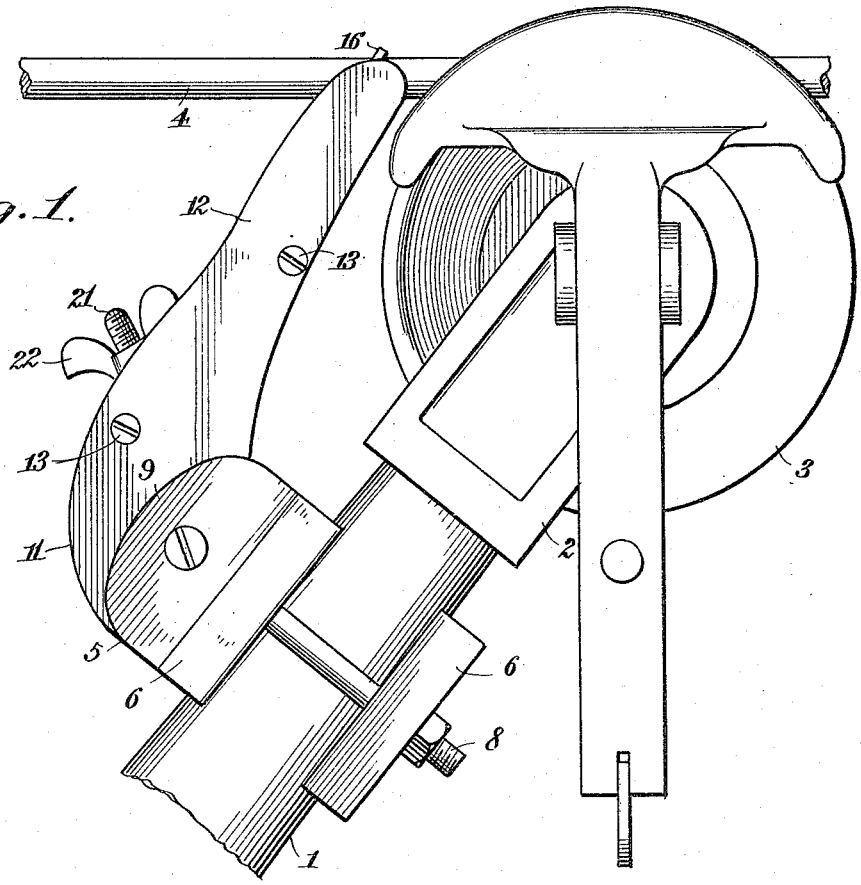
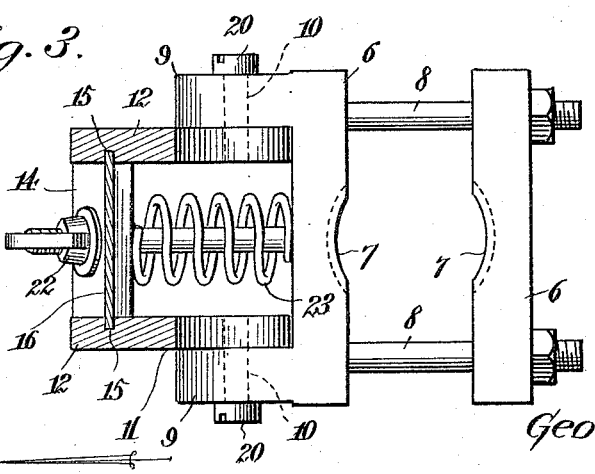

G. B. FOUTS.
DEVICE FOR REMOVING SNOW AND ICE FROM TROLLEY WIRES.
APPLICATION FILED AUG. 2, 1915.
1,192,053.
Patented July 25, 1916.
2 SHEETS—SHEET 2.
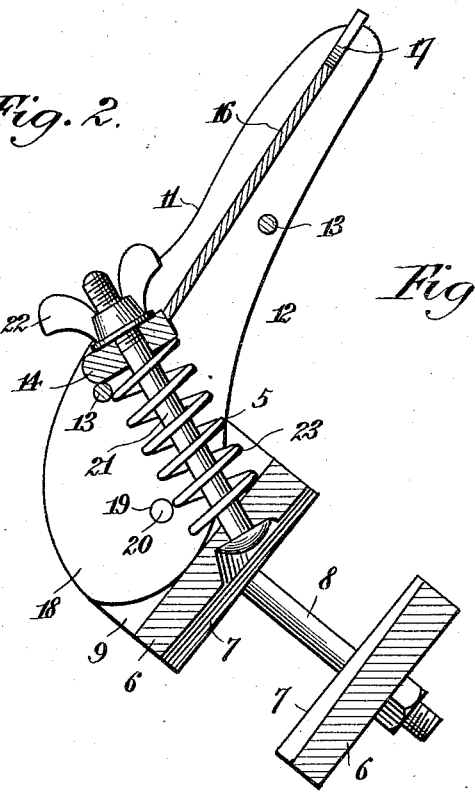
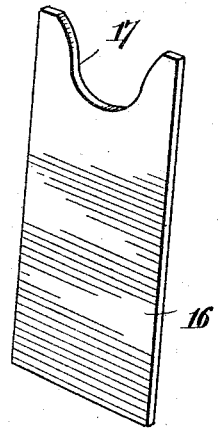
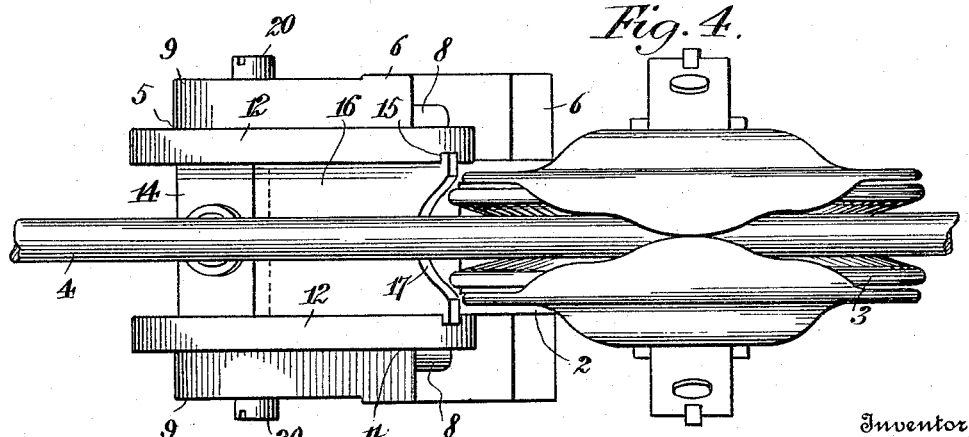
Inventor,
George B. Fouts.
Witnesses:
C. Peinle, Jr.
John J. McCarthy
By Victor J. Evans,
Attorney.

UNITED STATES PATENT OFFICE.

GEORGE B. FOUTS, OF ALLIANCE, OHIO.

DEVICE FOR REMOVING SNOW AND ICE FROM TROLLEY-WIRES.

1,192,053.  Specification of Letters Patent.  Patented July 25, 1916.

Application filed August 2, 1915. Serial No. 43,222.

*To all whom it may concern:*

Be it known that I, GEORGE B. FOUTS, a citizen of the United States, residing at Alliance, in the county of Stark and State of Ohio, have invented new and useful Improvements in Devices for Removing Snow and Ice from Trolley-Wires, of which the following is a specification.

This invention relates to improvements in devices for removing snow and ice from trolley wires and has particular application to a trolley pole carried ice remover.

In carrying out the present invention, it is my purpose to provide a device of the class described which may be applied to the trolley pole and which will engage the trolley wire in advance of the trolley wheel so as to scrape the ice from the wire as the wheel traverses the wire, thereby insuring a good electrical connection between the trolley wheel and the wire, and which may be removed from the trolley pole quickly and conveniently whenever desired.

It is also my purpose to provide an ice remover for trolley wires which will embrace the desired features of simplicity, efficiency and durability, which may be manufactured and marketed at small cost and which will operate efficiently and effectively for its intended purpose.

With the above and other objects in view, the invention consists in the construction, combination and arrangement of parts hereinafter set forth in and falling within the scope of the claim.

In the accompanying drawings, Figure 1 is a view in side elevation of an ice remover constructed in accordance with the present invention, the same being shown as attached to a trolley pole and engaging the trolley wire. Fig. 2 is a longitudinal sectional view through the device. Fig. 3 is an enlarged cross sectional view therethrough. Fig. 4 is a top plan view of the device showing the same in engagement with the wire. Fig. 5 is a perspective view of the scraper blade removed from the device.

Referring now to the drawings in detail, 1 designates a trolley pole having the upper end thereof equipped with a harp 2 carrying the trolley wheel 3 that is designed to bear against the trolley wire 4.

My improved ice remover is indicated as an entirety by the numeral 5 and comprises clamping plates 6, 6 placed face to face and having the confronting faces thereof formed with transverse grooves 7 designed to receive the top and bottom portions respectively of a trolley pole. Passed through alining openings in the plates 6, 6 at the opposite sides of the grooves 7 are clamping bolts 8 whereby the plates may be drawn together to clamp the trolley pole. Secured to the upper surface of the top plate 6 and projecting upwardly therefrom adjacent to the respective ends of the plate are pivot lugs 9 formed with alining bearing openings 10.

11 designates a scraper comprising side bars 12, 12 rigidly connected together by means of securing bolts 13 and held spaced apart in parallelism by means of a spacer block 14. Formed in the confronting faces of the side bars 12, 12 at one side of the spacer block are longitudinal grooves 15 and slidably mounted in the grooves 15 is a scraper blade 16. In the present instance, the outer end of the blade 16 is formed with a concavity 17 designed to receive the trolley wire. The remaining end portions of the side bars 12, 12, that is the portions of the side bars at the opposite side of the spacer block, project downwardly as at 18, and are disposed between the lugs 9 and formed with bearing openings 19 alining with the openings 10 in the lugs 9 and through these alining bearing openings are passed pivot bolts 20 forming pivotal connections between the scraper and the top plate 6. Passed through an opening in the top plate 6 and loosely mounted in such opening and projecting upwardly from the plate through an opening in the spacer block is a bolt 21 having the upper end screw-threaded and threaded onto such end of the bolt is a thumb nut 22, while encircling the bolt between the spacer block 14 and the top plate 6 is a coiled expansion spring 23 acting to force the scraper upwardly, the nut 22 limiting the upward movement of the scraper under the action of the spring.

In practice, the plates 6, 6 are fastened to the trolley pole or harp in advance of the trolley wheel and the nut 22 loosened so that the spring 23 may react and force the concaved end of the blade 16 into engagement with the trolley wire and hold such end of the blade in engagement with the trolley wire so that any ice on the wire will be scraped therefrom in the movement of the device along the wire in the travel of the car.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

My improved ice removing device is preferably used in connection with a trolley wheel guard such, for instance, as that disclosed in my copending application, Serial No. 26,035. When used in connection with the trolley wheel guard, the guard acts to maintain the scraper of the device in engagement with the wire so as to insure the removal of all ice therefrom, while the trolley wheel is prevented from leaving the wire. I have shown a trolley wheel guard secured to the trolley harp in Figs. 1 and 4 of the drawings.

I claim:

A device for scraping ice from trolley wires comprising a scraper formed of longitudinal side bars spaced apart in parallelism and having the confronting faces thereof formed with longitudinal grooves, a scraper blade in said grooves and removable therefrom and adapted to engage a trolley wire, a spacer block between said side bars at the lower end of the scraper blade, a clamp adapted to engage the trolley pole, a pivotal connection between said clamp and side bars, a spring interposed between said clamp and spacer block and acting to hold the scraper blade normally in engagement with the trolley wire, and means for limiting the movement of the scraper under the action of said spring.

In testimony whereof I affix my signature in presence of two witnesses.

GEO. B. FOUTS.

Witnesses:
D. M. ARMSTRONG,
W. J. WILLIAMS.

Copies of this patent may be obtained for five cents each, by addressing the "Commissioner of Patents, Washington, D. C."